United States Patent
Van Slyke et al.

(10) Patent No.: US 10,435,610 B2
(45) Date of Patent: Oct. 8, 2019

(54) DRILLING FLUID FOR DOWNHOLE ELECTROCRUSHING DRILLING

(71) Applicants: Halliburton Energy Services, Inc., Houston, TX (US); Chevron U.S.A. Inc., San Ramon, CA (US)

(72) Inventors: Donald Curtis Van Slyke, Richmond, TX (US); Dale E. Jamison, Humble, TX (US); William Walter Shumway, Spring, TX (US)

(73) Assignees: Halliburton Energy Services, Inc., Houston, TX (US); Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/534,849

(22) PCT Filed: Jun. 16, 2016

(86) PCT No.: PCT/US2016/037827
§ 371 (c)(1),
(2) Date: Jun. 9, 2017

(87) PCT Pub. No.: WO2017/217990
PCT Pub. Date: Dec. 21, 2017

(65) Prior Publication Data
US 2018/0194986 A1    Jul. 12, 2018

(51) Int. Cl.
*C09K 8/36* (2006.01)
*E21B 7/15* (2006.01)
(Continued)

(52) U.S. Cl.
CPC .................. *C09K 8/36* (2013.01); *E21B 7/15* (2013.01); *E21B 10/00* (2013.01);
(Continued)

(58) Field of Classification Search
None
See application file for complete search history.

(56) References Cited

U.S. PATENT DOCUMENTS

| | | | |
|---|---|---|---|
| 5,072,794 A | 12/1991 | Hale et al. | |
| 6,787,505 B1 * | 9/2004 | Maitland | C09K 8/32 166/254.2 |

(Continued)

FOREIGN PATENT DOCUMENTS

| | | |
|---|---|---|
| CN | 103131398 | 6/2013 |
| WO | 96/22342 | 7/1996 |

(Continued)

OTHER PUBLICATIONS

Note, Application. "Solutions for measuring permittivity and permeability with LCR meters and impedance analyzers." Agilent Literature Number (2008).; 25 pages.

(Continued)

*Primary Examiner* — Jeffrey D Washville
(74) *Attorney, Agent, or Firm* — Baker Botts L.L.P.

(57) ABSTRACT

The disclosure relates to an electrocrushing drilling fluid with an electrocrushing drilling base fluid including a non-polar oil, —OH, —$(OH)_2$, or —$(OH)_3$ alcohol, water, and an emulsifier in proportional amounts by weight or volume in that order. The electrocrushing drilling fluid may further contain at least one additive. The electrocrushing drilling fluid may have a dielectric constant or dielectric strength of at least a set amount, an electric conductivity or viscosity less than a set amount, or a combination of these properties. The disclosure further relates to an electrocrushing drilling system containing the electrocrushing drilling fluid and an electrocrushing drill bit and a method of electrocrushing drilling.

25 Claims, 2 Drawing Sheets

(51) Int. Cl.
*E21B 10/00* (2006.01)
*E21B 21/00* (2006.01)
*E21B 21/06* (2006.01)
*E21B 41/02* (2006.01)

(52) U.S. Cl.
CPC ...... *C09K 2208/12* (2013.01); *C09K 2208/32* (2013.01); *C09K 2208/34* (2013.01); *E21B 21/003* (2013.01); *E21B 21/062* (2013.01); *E21B 21/063* (2013.01); *E21B 41/02* (2013.01)

(56) References Cited

U.S. PATENT DOCUMENTS

| | | |
|---|---|---|
| 7,959,094 B2 | 6/2011 | Moeny |
| 9,190,190 B1 | 11/2015 | Moeny |
| 2004/0014609 A1 | 1/2004 | Dalmazzone et al. |
| 2006/0037516 A1 | 2/2006 | Moeny |
| 2009/0133929 A1 | 5/2009 | Rodland |
| 2010/0212962 A1 | 8/2010 | Rosten et al. |
| 2013/0112482 A1 | 5/2013 | Armistead et al. |
| 2014/0066338 A1 | 3/2014 | Wagle et al. |
| 2015/0027702 A1* | 1/2015 | Godoy-Vargas ......... C09K 8/90 166/279 |
| 2015/0322326 A1* | 11/2015 | Van Slyke ............... C09K 8/34 175/16 |
| 2016/0017663 A1 | 1/2016 | Moeny |
| 2016/0152883 A1 | 6/2016 | Fernandez |
| 2017/0067292 A1 | 3/2017 | Bayol et al. |

FOREIGN PATENT DOCUMENTS

| | | |
|---|---|---|
| WO | 2006/023998 | 3/2006 |
| WO | 2013/184457 | 12/2013 |
| WO | 2015/124733 | 8/2015 |
| WO | 2016/053236 | 4/2016 |

OTHER PUBLICATIONS

Keysight Technologies, "Keysight 16452A Liquid Test Fixture." Operation and Service Manual, Nov. 4, 2014; 51 pages.

International Search Report and Written Opinion for PCT Patent Application No. PCT/US2016/037856, dated Mar. 15, 2017; 12 pages.

International Search Report and Written Opinion for PCT Patent Application No. PCT/US2016/037827, dated Mar. 15, 2017; 12 pages.

International Search Report and Written Opinion for PCT Patent Application No. PCT/US2016/037835, dated Feb. 28, 2017; 15 pages.

International Search Report and Written Opinion for PCT Patent Application No. PCT/US2016/037841, dated Mar. 15, 2017; 15 pages.

* cited by examiner

DRILLING FLUID FOR DOWNHOLE ELECTROCRUSHING DRILLING

RELATED APPLICATIONS

This application is a U.S. National Stage Application of International Application No. PCT/US2016/037827 filed Jun. 16, 2016, which designates the United States, and is incorporated herein by reference in its entirety.

TECHNICAL FIELD

The present disclosure relates generally to a drilling fluid for downhole electrocrushing drilling.

BACKGROUND

Electrocrushing drilling uses pulsed power technology to drill a borehole in a rock formation. Pulsed power technology repeatedly applies a high electric potential across the electrodes of an electrocrushing drill bit, which ultimately causes the surrounding rock to fracture.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
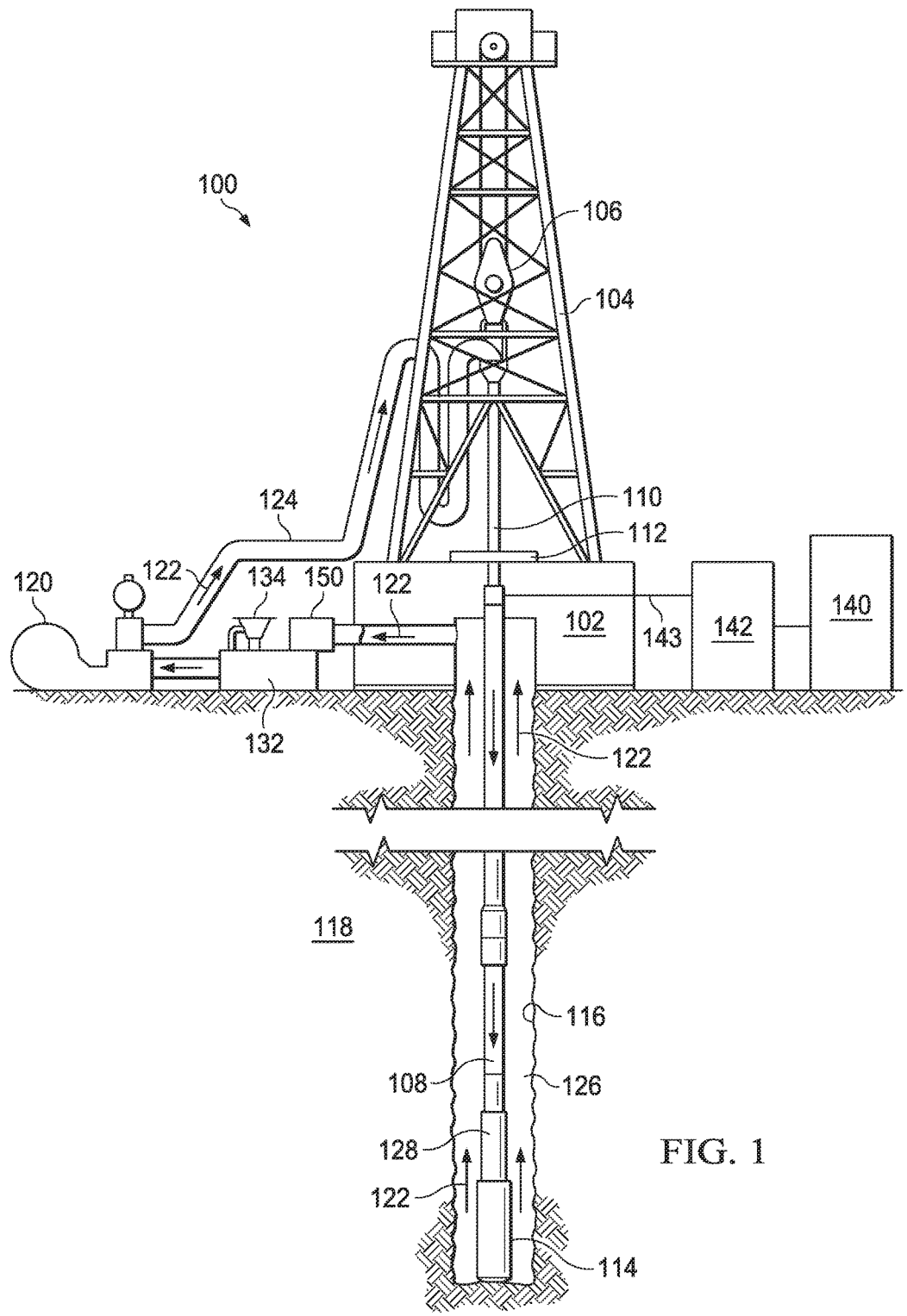
FIG. 1 is an elevation view of a downhole electrocrushing drilling system used in a wellbore environment.

Electrocrushing drilling may be used to form wellbores in subterranean rock formations for recovering hydrocarbons, such as oil and gas, from these formations. Electrocrushing drilling uses pulsed-power technology to repeatedly fracture the rock formation by repeatedly delivering high-energy electrical pulses to the rock formation. The fractured rock is removed from the vicinity of the electrocrushing drill bit by drilling fluid. Although drilling fluids used in conventional mechanical drill bit drilling methods also remove fractured rock from the vicinity of the drill bit, thereby allowing drilling to progress downhole, drilling fluids suitable for use with a conventional mechanical drill bit are typically not suitable for use with an electrocrushing drill bit. Electrocrushing drilling fluids have a sufficiently high frequency dependent dielectric constant (also referred to as dielectric constant herein) and dielectric strength, and a sufficiently low electrical conductivity to allow an electrocrushing drill bit to direct an arc of electric current through a portion of the rock in the formation, heating water and other materials in the rock and causing that rock and surrounding rock to fracture.

For a given electrocrushing drill bit, the dielectric constant and dielectric strength of the drilling fluid are sufficiently high if electric fields generated by the electrocrushing drill bit are directed away from the drilling fluid and into the rock formation, the rock formation is still fractured, the drilling operation proceeds downhole at at least a set rate, the drilling operation is economically viable, or any combination of these parameters.

For a given electrocrushing drill bit, the electrical conductivity of a drilling fluid is sufficiently low if leakage current from the electrocrushing drill bit into the drilling fluid is sufficiently low that the rock formation is still fractured, the drilling operation proceeds downhole at at least a set rate, the drilling operation is economically viable, or any combination of these parameters.

Typically, an electrocrushing drilling fluid will have both sufficient dielectric and electric conductivity properties.

Furthermore, some electrocrushing drilling fluids and electrocrushing drilling systems using such fluids additionally differ from conventional drilling fluids and systems by being more resistant to cavitation caused by electrocrushing drilling or by better mitigating cavitation effects.

An electrocrushing drilling fluid of the present disclosure includes an electrocrushing drilling base fluid containing a non-polar oil, a one, two, or three hydroxyl (—OH, —(OH)$_2$, or —(OH)$_3$) alcohol, such as a glycol, water, and an emulsifier in an invert emulsion that contains an internal alcohol phase. The electrocrushing drilling base fluid may contain, by weight or by volume, relatively more non-polar oil than —OH, —(OH)$_2$, or —(OH)$_3$ alcohol, relatively more —OH, —(OH)$_2$, or —(OH)$_3$ alcohol than water, and relatively more water than emulsifier.

The electrocrushing drilling fluid may also contain additives.

Figure 2:
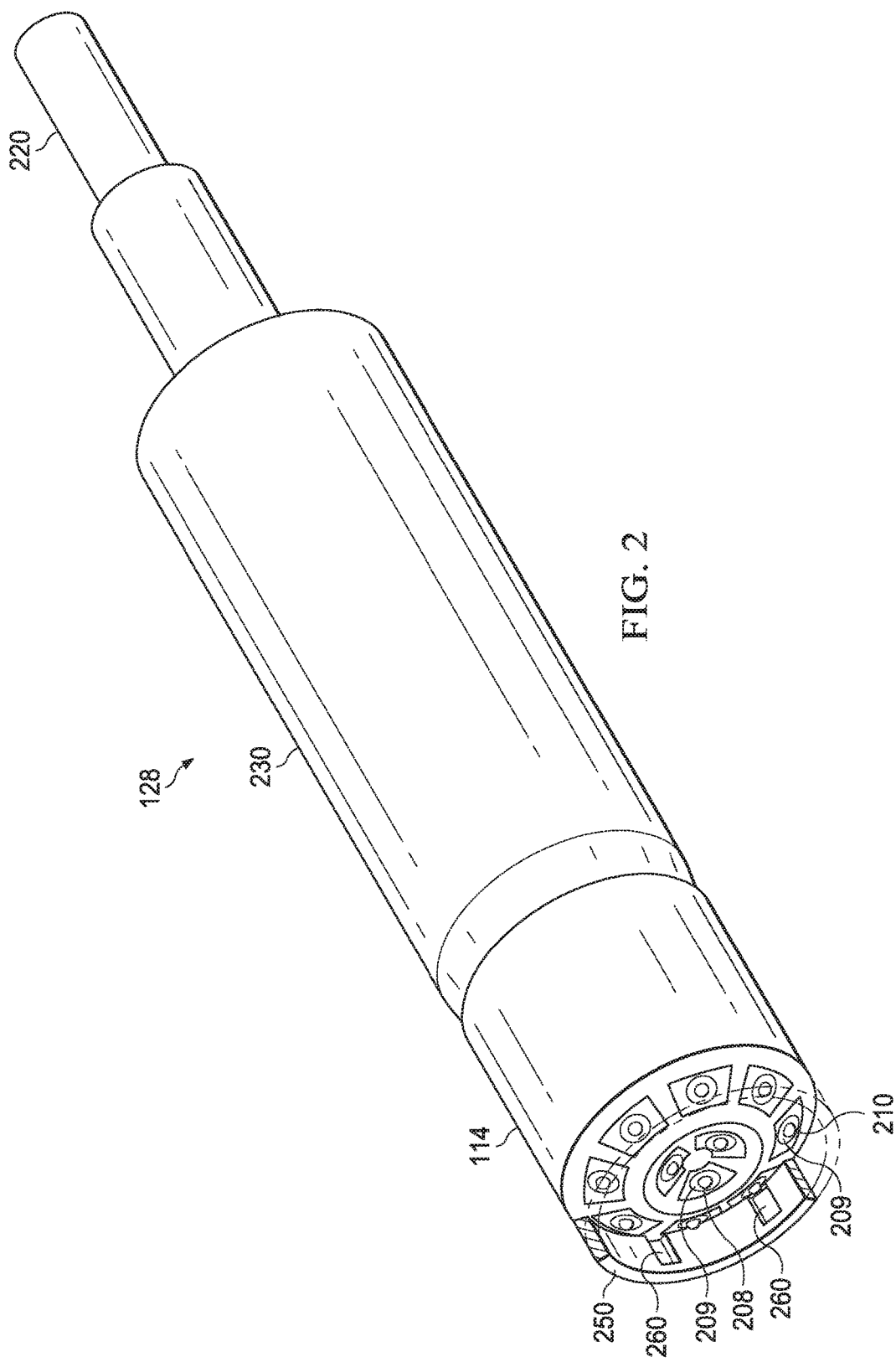
FIG. 2 illustrates exemplary components of a bottom hole assembly for a downhole electrocrushing drilling system.

Drilling System Using an Electrocrushing Drill Bit and Electrocrushing Drilling Fluid Embodiments of the present disclosure and its advantages may be understood by referring to FIGS. 1 and 2, where like numbers are used to indicate like and corresponding parts.

FIG. 1 is an elevation view of an exemplary electrocrushing drilling system used to form a wellbore in a subterranean formation. Although FIG. 1 shows land-based equipment, downhole tools incorporating teachings of the present disclosure may be satisfactorily used with equipment located on offshore platforms, drill ships, semi-submersibles, and drilling barges (not expressly shown). Additionally, while wellbore 116 is shown as being a generally vertical wellbore, wellbore 116 may be any orientation including generally horizontal, multilateral, or directional.

Drilling system 100 includes drilling platform 102 that supports derrick 104 having traveling block 106 for raising and lowering drill string 108. Drilling system 100 also includes pump 104, which circulates electrocrushing drilling fluid 122 through feed pipe 124 to kelly 110, which in turn conveys electrocrushing drilling fluid 122 downhole through interior channels of drill string 108 and through one or more orifices in electrocrushing drill bit 114. Electrocrushing drilling fluid 122 then circulates back to the surface via annulus 126 formed between drill string 108 and the sidewalls of wellbore 116. Typically, during use of drilling system 100, electrocrushing drilling fluid 122 carries fractured rock formed by electrocrushing drill bit 114 back to the surface with it.

Electrocrushing drill bit 114 is attached to the distal end of drill string 108. In some embodiments, electrocrushing drill bit 114 may be supplied power from the surface. For example, generator 140 may generate electrical power and provide that power to power-conditioning unit 142. Power-conditioning unit 142 may then transmit electrical energy downhole via surface cable 143 and a sub-surface cable (not expressly shown in FIG. 1) contained within drill string 108. A pulse-generating circuit within bottom-hole assembly (BHA) 128 may receive the electrical energy from power-conditioning unit 142, and may generate high-energy pulses to drive electrocrushing drill bit 114.

For example, pulsed-power technology may be utilized to repeatedly apply a high electric potential, for example up to or exceeding 150 kV, across the electrodes of electrocrushing drill bit 114. Each application of electric potential is referred to as a pulse. When the electric potential across the electrodes of electrocrushing drill bit 114 is increased enough during a pulse to generate a sufficiently high electric field, an electrical arc forms through a rock formation at the bottom of wellbore 116. The arc temporarily forms an electrical coupling between the electrodes, allowing electric current to flow through the arc inside a portion of the rock formation at the bottom of wellbore 116. The arc greatly increases the temperature and pressure of the portion of the rock formation through which the arc flows and the surrounding formation and materials. The temperature and pressure is sufficiently high to break the rock itself onto small bits or cuttings.

As electrocrushing drill bit 114 repeatedly fractures rock and electrocrushing drilling fluid 122 moves the fractured rock uphole, wellbore 116, which penetrates various subterranean rock formations 118, is created. Wellbore 116 may be any hole drilled into a subterranean formation or series of subterranean formations for the purpose of exploration or extraction of natural resources such as, for example, hydrocarbons, or for the purpose of injection of fluids such as, for example, water, wastewater, brine, or water mixed with other fluids. Additionally, wellbore 116 may be any hole drilled into a subterranean formation or series of subterranean formations for the purpose of geothermal power generation.

FIG. 2 illustrates exemplary components of a bottom hole assembly for downhole electrocrushing drilling system 100. Bottom-hole assembly (BHA) 128 may include pulsed-power tool 230. BHA 128 may also include electrocrushing drill bit 114. For the purposes of the present disclosure, electrocrushing drill bit 114 may be referred to as being integrated within BHA 128, or may be referred to as a separate component that is coupled to BHA 128.

Pulsed-power tool 230 may be coupled to provide pulsed power to electrocrushing drill bit 114. Pulsed-power tool 230 receives electrical energy from a power source via cable 220. For example, pulsed-power tool 230 may receive power via cable 220 from a power source on the surface as described above with reference to FIG. 1, or from a power source located downhole such as a generator powered by a mud turbine. Pulsed-power tool 230 may also receive power via a combination of a power source on the surface and a power source located downhole. Pulsed-power tool 230 converts the electrical energy received from the power source into high-power electrical pulses, and may apply those high-power pulses across electrodes of electrocrushing drill bit 114. For the purposes of the present disclosure, ground ring 250 may also be referred to generally as an electrode or more specifically as a ground electrode. In one example, pulsed-power tool 230 may apply the high-power pulses across electrode 208 and ground ring 250 of electrocrushing drill bit 114. Pulsed-power tool 230 may also apply high-power pulses across electrode 210 and ground ring 250 in a similar manner as described herein for electrode 208 and ground ring 250.

Pulsed-power tool 230 may include a pulse-generating circuit. Such a pulse-generating circuit may include high-power capacitors and which may include fuse-protection.

Referring to FIG. 1 and FIG. 2, electrocrushing drilling fluid 122 may exit drill string 108 via openings 209 surrounding each electrode 208 and each electrode 210. The flow of electrocrushing drill fluid 122 out of openings 209 allows electrodes 208 and 210 to be insulated by the electrocrushing drilling fluid. In some embodiments, electrocrushing drill bit 114 may include a solid insulator (not expressly shown in FIG. 1 or 2) surrounding electrodes 208 and 210 and one or more orifices (not expressly shown in FIG. 1 or 2) on the face of electrocrushing drill bit 114 through which electrocrushing drilling fluid 122 may exit drill string 108. Such orifices may be simple holes, or they may be nozzles or other shaped features. Because fines are not typically generated during electrocrushing drilling, as opposed to mechanical drilling, electrocrushing drilling fluid 122 may not need to exit the drill bit at as high a pressure as the drilling fluid in mechanical drilling. As a result, nozzles and other features used to increase drilling fluid pressure may not be needed. However, nozzles or other features to increase electrocrushing drilling fluid 122 pressure or to direct electrocrushing drilling fluid may be included for some uses.

Drilling fluid 122 is typically circulated through drilling system 100 at a flow rate sufficient to remove fractured rock from the vicinity of electrocrushing drill bit 114 in sufficient quantities within a sufficient time to allow the drilling operation to proceed downhole at least at a set rate. In addition, electrocrushing drilling fluid 122 may be under sufficient pressure at a location in wellbore 116, particularly a location near a hydrocarbon, gas, water, or other deposit, to prevent a blowout.

Electrodes 208 and 210 may be at least 0.4 inches apart from ground ring 250 at their closest spacing, at least 1 inch apart at their closest spacing, at least 1.5 inches apart at their closest spacing, or at least 2 inches apart at their closest spacing. If drilling system 100 experiences vaporization bubbles in electrocrushing drilling fluid 122 near electrocrushing drill bit 114, the vaporization bubbles may have deleterious effects. For instance, vaporization bubbles near electrodes 208 or 210 may impede formation of the arc in the rock. Electrocrushing drilling fluids 122 may be circulated at a flow rate also sufficient to remove vaporization bubbles from the vicinity of electrocrushing drill bit 114.

In addition, electrocrushing drill bit 114 may include ground ring 250, shown in part in FIG. 2. Although not all electrocrushing drill bits 114 may have ground ring 250, if it is present, it may contain passages 260 to permit the flow of electrocrushing drilling fluid 122 along with any fractured rock or bubbles away from electrodes 208 and 210 and uphole.

Referring again to FIG. 1, at the surface, recirculated or spent electrocrushing drilling fluid 122 exits annulus 126. Recirculated or spent electrocrushing drilling fluid 122 may simply be directed back into drill string 108 or may otherwise be processed using only some of the equipment shown in FIG. 1. However, in the drilling system 100, electrocrushing drilling fluid 122 is conveyed to one or more fluid processing units 150 via an interconnecting flow line 130. After passing through fluid processing units 150, cleaned electrocrushing drilling fluid 122 is deposited into retention pit 132. Although fluid processing unit 150 is illustrated in FIG. 1 near the outlet of the wellbore 116, fluid processing unit 150 may be located at a distance from the outlet of wellbore 116.

Drilling system 100 may further include mixing hopper 134 communicably coupled to or otherwise in fluidic communication with retention pit 132. Mixing hopper 134 may include, but is not limited to, mixers and related mixing equipment. Mixing hopper 134 may be used to add additives to electrocrushing drilling fluid 122.

Drilling fluid 122 is typically circulated through drilling system 100 at a flow rate sufficient to remove fractured rock from the vicinity of electrocrushing drill bit 114 in sufficient quantities within a sufficient time to allow the drilling operation to proceed downhole at at least a set rate.

In addition, electrocrushing drilling fluid 122 may be under sufficient pressure at a location in wellbore 116, particularly a location near a hydrocarbon, gas, water, or other deposit, to prevent a blowout.

If drilling system 100 experiences cavitation in electrocrushing drilling fluid 122 near electrocrushing drill bit 112, the may have various deleterious effects. For instance, cavitation bubbles near electrodes 208 and 210 may impede formation of the arc in the rock. Electrocrushing drilling fluids 122 may be circulated at a flow rate also sufficient to remove cavitation bubbles from the vicinity of electrocrushing drill bit 114 in sufficient quantities within a sufficient time to allow the drilling operation to proceed downhole at at least a set rate and to avoid damage to drill bit 112 from the cavitation bubbles, for instance damage resulting from the cavitation bubbles reentering drill bit 112.

Electrocrushing Drilling Fluid

To limit discharge of the electric field through electrocrushing drilling fluid 122 and allow more electrical current to flow into the rock at the end of wellbore 116, an electrically insulating electrocrushing drilling fluid 122 with a high dielectric constant and a high dielectric strength at a particular operating frequency may be used. An electrically insulating electrocrushing drilling fluid 122 restricts the movement of electrical charges, and therefore, the flow of electrical current through the electrocrushing drilling fluid 122. A high dielectric constant and high dielectric strength decrease electrical discharge through electrocrushing drilling fluid 122. The dielectric constant of the downhole fluid indicates the ability of the electrocrushing drilling fluid to store electrical energy when exposed to an electric field, such as the potential created by electrocrushing drill bit 114, while the dielectric strength of the downhole fluid indicates a voltage level to which electrocrushing drilling fluid 122 may be exposed before experiencing electrical breakdown, or a loss of its electrically insulating properties.

Electrocrushing drilling fluid 122 may be formulated to have:

i) at least a set dielectric constant, such as at least 6, at least 10, at least 12, or at least 13 (at 100 kHz frequency), ii) at least a set dielectric strength, such as at least 100 kV/cm, at least 150 kV/cm, or at least 330 kV/cm (at 10 microseconds rise time), iii) less than a set electric conductivity, such as less than $10^{-4}$ mho/cm, or less than $10^{-5}$ mho/cm, iv) less than a set viscosity, such as less than 9 cSt at 40° C., more particularly less than 8 cSt at 40° C., or any combinations thereof.

Electrocrushing drilling fluid 122 includes an electrocrushing drilling base fluid and may include one or more additives. Generally, the electrocrushing drilling base fluid may be present in an amount sufficient to form a pumpable electrocrushing drilling fluid. By way of example, the electrocrushing drilling base fluid may be present in electrocrushing drilling fluid 122 in an amount in the range of from 200/% to 99.99% by volume of electrocrushing drilling fluid 122.

The electrocrushing drilling base fluid contains by weight or by volume, relatively more non-polar oil than —OH, —(OH)$_2$, or —(OH)$_3$ alcohol, relatively more —OH, —(OH)$_2$, or —(OH)$_3$ alcohol than water, and relatively more water than emulsifier.

In particular, the electrocrushing drilling base fluid may contain between 50% and 75%, more particularly between 60/o and 65% non-polar oil by weight. It may contain between 60% and 80%, more particularly between 70% and 75% non-polar oil by volume.

The electrocrushing drilling base fluid may contain between 15% and 35%, more particularly between 22% and 27% —OH, —(OH)$_2$, or —(OH)$_3$ alcohol by weight. It may contain between 10% and 30%, more particularly between 15% and 20% —OH, —(OH)$_2$, or —(OH)$_3$ alcohol by volume.

The electrocrushing drilling base fluid may contain between 2% and 30%, more particularly between 8% and 13% water by weight. It may contain between 1% and 25%, more particularly between 5% and 10% water by volume.

The electrocrushing drilling base fluid may contain between 0.1% and 10%, more particularly between 1.5% and 3.5% emulsifier by weight. It may contain between 0.1% and 10%, more particularly between 1.5% and 3.5% emulsifier by volume.

The amount of emulsifier in a particular electrocrushing drilling base fluid may particularly depend upon the relative amounts of non-polar oil, —OH, —(OH)$_2$, or —(OH)$_3$ alcohol, and water. —OH, —(OH)$_2$, or —(OH)$_3$ alcohol, such as glycols, are relatively chemically active and thus may react with water in the electrocrushing drilling fluid. However, the emulsifier creates a micelle interphase between the non-polar oil and the polar water. The —OH, —(OH)$_2$, or —(OH)$_3$ alcohol is miscible in the water to form a combined aqueous phase that is emulsified in the continuous non-polar oil phase.

The above percentages by weight and volume represent the electrocrushing drilling base fluid prior to use. During use, the electrocrushing drilling fluid may absorb water (and dissolved salts), typically from the rock formation. Although this water absorption may result in relative percentages by weight and volume outside of the ranges recited above, typically the electrocrushing drilling base fluid will remain within the recited ranges, or at least will have proportionally more —OH, —(OH)$_2$, or —(OH)$_3$ alcohol and non-polar oil than water, if it remains suitable for further use.

The electrocrushing drilling base fluid may contain essentially no other components, or less than 1.0% by weight or volume other components prior to use. As noted above, salt may enter the electrocrushing drilling fluid, including the electrocrushing drilling base fluid, with water during use. Small amounts of salt may also be present in the electrocrushing drilling base fluid prior to use.

The electrocrushing drilling base fluid may contain no or less than 0.1% by weight or volume polar oil or alkylene carbonate.

Non-polar oils typically have a high dielectric strength and a low electric conductivity as well as a low viscosity. However, non-polar oils have a low dielectric constant, so they may be included with other components with a higher dielectric constant in an electrocrushing drilling base fluid. A non-polar oil suitable for use in an electrocrushing drilling base fluid of the present disclosure includes combinations of non-polar oils. Suitable non-polar oils include mineral oils, diesel oils or fuels, paraffin-based oils, oils containing branched and linear aliphatic hydrocarbons having between 8 and 26 carbon atoms and a boiling point in the range of 120° C. to 380° C., oils containing hydrocarbons having between 10 and 16 carbon atoms and a viscosity of 1.5 to 2 cSt at 40° C. Any of the non-polar oils or combinations thereof may have a viscosity of less than 4 cSt at 40° C.

Water has a low viscosity and a high dielectric strength, but it also has a high electric conductivity, thus potentially limiting its proportional volume in an electrocrushing drilling fluid or base fluid. The electric conductivity of water further increases if salts are dissolved in the water, a frequent occurrence during drilling.

Water additionally has a highly temperature-variable dielectric constant that decreases with temperature and thus which may also limit water's proportional volume in an electrocrushing drilling base fluid because the electrocrushing drilling fluid typically experiences high temperatures in the vicinity of the electrocrushing drill bit.

—OH, —(OH)$_2$, or —(OH)$_3$ alcohol, particularly glycols, typically have a high dielectric constant and low electric conductivity, making them a useful material in an electrocrushing drilling base fluid also containing a non-polar oil and water. However, —OH, —(OH)$_2$, or —(OH)$_3$ alcohol also have a low dielectric strength, thus potentially limiting their proportional volume in an electrocrushing drilling base fluid.

—OH alcohols suitable for use in the present disclosure include branched and unbranched alcohols with the general formula $C_xH_qOH$, wherein $1 \leq x \leq 18$ and q is a quantity sufficient to render the —OH alcohol electronegative, and any combinations thereof.

—(OH)$_2$ alcohols suitable for use in the present disclosure include branched and unbranched alcohols with the general formula $C_yH_r(OH)_2$, wherein $1 \leq y \leq 18$ and r is a quantity sufficient to render the —(OH)$_2$ alcohol electronegative, and any combinations thereof. Suitable —(OH)$_2$ alcohols particularly include glycols such as ethylene glycol, propylene glycol, butane diol, and any combinations thereof.

—(OH)$_3$ alcohols suitable for use in the present disclosure include branched and unbranched alcohols with the general formula $C_zH_r(OH)_3$, wherein $1 \leq z \leq 18$ and r is a quantity sufficient to render the —(OH)$_3$ alcohol electronegative, and any combinations thereof. Suitable —(OH)$_3$ alcohols particularly include glycerin.

—OH, —(OH)$_2$, or —(OH)$_3$ alcohols suitable for use in the present disclosure may further include combinations of —OH, —(OH)$_2$, or —(OH)$_3$ alcohols or combinations of —OH, —(OH)$_2$, or —(OH)$_3$ alcohols with other alcohols.

Some —OH, —(OH)$_2$, or —(OH)$_3$ alcohols may contain one —OH group per 6 carbons to facilitate solubility. For example, a $C_{18}$ alcohol may have three —OH groups.

The —OH, —(OH)$_2$, or —(OH)$_3$ alcohols may also be at least partially miscible with water. Further, the —OH, —(OH)$_2$, or —(OH)$_3$ alcohols may be able to increase water phase activity of the internal aqueous phase of an invert emulsion.

Emulsifiers help create a mixture of two immiscible liquids, such as an oil-based liquid and an aqueous liquid. Suitable emulsifiers for use in an electrocrushing drilling base fluid include polyaminated fatty acids, tall oil fatty acids, including palmitic acid, oleic acid, and linoleic acid, oxidized and modified tall oil fatty acids, rosin acids, including rings with the empirical formula $C_{19}H_{29}COOH$, oxidized and modified rosin acids, and other emulsifiers with a hydrophilic lipiphilic balance (HLB) between 4 and 10, and any combinations thereof. An electrocrushing drilling base fluid of the present disclosure is an invert emulsion and thus may particularly benefit from an emulsifier.

The type of non-polar oil or combination of non-polar oils as well as the type of emulsifier or combination of emulsifiers in the electrocrushing drilling base fluid may also be based at least partially upon other components of the electrocrushing drilling fluid, a particular drilling system, the formation, or any combinations thereof.

One or more electrical additives may change one or more electrical properties of the electrocrushing drilling base fluid. For instance, an electrical additive may change a dielectric property of the electrocrushing drilling base fluid. Such additives may include mica in any of its various forms such as muscovite, phlogopite, leidolite, fluorophlogopite, glass-bonded mica, and biotite, polytetrafluoroethylene, other chemical variants of tetrafluoroethylene, glass or a composition of glass including fused silica and alkalisilicate, polystyrene, polyethylene, diamond, lead zirconate titanate (PZT), sodium chloride crystalline, potassium bromide crystalline, silicone oil, benzene, and any combinations thereof. The electrical additive may be present in an electrocrushing drilling fluid in an amount sufficient for a particular drilling system, formation, or combination thereof. The type of electrical additive or combination of electrical additives in an electrocrushing drilling fluid may also be based at least partially upon a particular drilling system, formation, or combination thereof.

The electrocrushing drilling fluid may further include additives used in conventional drilling fluids. These additives may provide properties to the electrocrushing drilling fluid similar to the properties they provide to conventional drilling fluids. However, some additives used in conventional drilling fluids may not be suitable for an electrocrushing drilling fluid due to their effects on dielectric constant, dielectric strength, or electric conductivity, or because they are not compatible with an electrocrushing drill bit.

Additives may include a lost circulation prevention material, such as a bridging material or a fluid loss control agent, a rheology modifier, such as a viscosifier or a thinner, a weighting agent, a solids wetting agent, an acid or $H_2S$ scavenger, a lubricant other additives, and any combinations thereof.

Lost circulation materials are capable of reducing the amount of whole drilling fluid that is lost to fractures and natural caverns during the drilling process. Lost circulation materials include mica, fibers, and hard organic materials, such as nutshells. The lost circulation material may be present in an electrocrushing drilling fluid in an amount sufficient for a particular drilling system, formation, or combination thereof. The type of lost circulation material or combination of lost circulation materials in an electrocrushing drilling fluid may also be based at least partially upon a particular drilling system, formation, or combination thereof.

Lost circulation materials include bridging materials, which bridge across pores and fractures in the formation and help prevent loss of drilling fluid into the formation. Bridging materials may include calcium carbonate, salt supensions, resins, BARACARB® (Halliburton, Tex., US) size-ground marble, N-SEAL™ (Halliburton, Tex., US) extrusion spun mineral fiber or similar materials.

Fluid loss control agents, which help control loss of the liquid portion of the drilling fluid into the formation, may also be used in the electrocrushing drilling fluid. Fluid loss control agents include clays and polymers, such as synthetic polymers or natural polymers, such as lignitic polymers.

Rheology modifiers change the flow properties of the electrocrushing drilling fluid. Rheology modifiers may, for instance, change the shear properties or viscosity of the drilling fluid. The rheology modifier may be present in the electrocrushing drilling fluid in an amount sufficient for a particular drilling system, formation, or combination thereof. The type of rheology modifier or combination of rheology modifiers in the electrocrushing drilling fluid may also be based at least partially upon a particular drilling system, formation, or combination thereof.

Thinners are a type of rheology modifier that decrease the viscosity of a drilling fluid. In drilling fluids that experience flocculation, such as drilling fluids containing some clays, thinners may also be deflocculants. Electrocrushing drilling may benefit from a low viscosity drilling fluid, such that thinners may be a particularly useful additive.

Viscosifiers increase the viscosity of a drilling fluid. A viscosifier may be used in the drilling fluid to impart a sufficient carrying capacity or thixoropy or both to the drilling fluid, enabling the drilling fluid to transport and prevent settling of fractured rock or weighting materials, or both. Suitable viscosifiers include organophilic clays such as GELTONE® II viscosifier (Halliburton, Tex., US), polymeric viscosifiers, such as BARARESIN® VIS viscosifier (Halliburton, Tex., US), long chain fatty acids, dimer/trimer/tetramer fatty acids (RM-63™ viscosifier, Halliburton, Tex., US), and any combinations thereof.

The electrocrushing drilling fluid may have a viscosity at surface temperature and pressure sufficient to allow it to suspend any particles additives, such as barite or a dielectric modifier, while still allowing it to be pumped downhole. In the wellbore, the drilling fluid may maintain a viscosity sufficient to allow it to suspend any particle additives, while still allowing it to circulate through and out of the wellbore. The electrocrushing drilling fluid may further maintain a viscosity upon return to surface pressure or temperature sufficient to allow it to exit the wellbore. The electrocrushing drilling fluid may also further maintain its viscosity to allow it to continue to suspend any particles additives, such as barite, until it reaches a holding tank, through any cleaning or testing process, or until it is returned to a wellbore, as applicable.

Weighting agents increase the density of an electrocrushing drilling fluid without being dissolved in it. Suitable weighting agents include barite, hematite, ilmenite, manganese tetraoxide, and any combinations thereof. The weighting agent may be present in an electrocrushing drilling fluid in an amount sufficient for a particular drilling system, formation, or combination thereof. The type of weighting agent or combination of weighting agents in an electrocrushing drilling fluid may also be based at least partially upon a particular drilling system, formation, or combination thereof. Typically, for electrocrushing drilling, the amount of weighing agent present is sufficient to maintain an electrocrushing drilling fluid density between 8 lb/gallon and 21 lb/gallon.

Other additives may include corrosion inhibitors, defoamers, shale stabilizers, lubricants, wetting agents, dispersing agents, shale inhibitors, pH-control agents, filtration-control agents, alkalinity sources such as lime and calcium hydroxide, salts, foamers, viscosifiers, thinners, deflocculents, or any combinations thereof. The other additives may be present an electrocrushing drilling fluid in an amount sufficient for a particular drilling system, formation, or combination thereof. The type of other additives or combination of other additives in an electrocrushing drilling fluid may also be based at least partially upon a particular drilling system, formation, or combination thereof.

Some additives, such as lignitic fluid loss control agents and polaminated fatty acid emulsifiers, may have synergistic effects.

In addition to conventional uses for additives, some additives may have a further effect or may be added solely for the effect of rendering the electrocrushing drilling fluid or the drilling system more resistant to cavitation caused by electrocrushing drilling or by better mitigating cavitation effect as compared to conventional drilling fluids or electrocrushing drilling fluids without the additive.

EXAMPLES

The following examples are provided to further illustrate certain aspects of the invention and should not be interpreted as disclosing the invention as a whole. In particular, substitutions within this example in accordance with the above disclosure are also encompassed by the invention.

Example 1—Electrocrushing Drilling Fluid with Base Fluid Containing Non-Polar Oil, Glycerin, Water, and Emulsifier The following components were mixed at high shear:

Non-polar oil—62.0 wt % (71.1 v %) Saraline 185V® (Shell Oil, Tex., US) (paraffin-based oil)

Glycerin—25.4 wt % (17.8 v %)

Water—10.1 wt % (8.9 v %)

Emulsifier—2.5 wt % (2.2 v %) LE Supermul® (Halliburton, Tex., US) (polyaminated fatty acid).

The mixture had a dielectric constant of 7.8 at 100 kHz did not separate until after 10 minutes of no agitation, at which time a clear oil layer emerged.

Example 2—Methods of Measuring Dielectric Constant and Electric Conductivity of an Electrocrushing Drilling Fluid The dielectric constant and electric conductivity of an electrocrushing drilling fluid, such as one disclosed herein, may be measured using a network analyzer or inductance, capacitance and resistance (LCR) meter equipped with a particular fixture, such as a liquid test fixture, to allow the measurement. Suitable measurement equipment includes that produced by Agilent (Santa Clara, Calif.) and Keysight (Santa Rosa, Calif.), particularly the Keysight 16452A Liquid Text Fixture and the Agilent E4991B Impedance Analyzer. Such equipment may be used in accordance with manufacturer instructions.

One of ordinary skill in the art may determine how to determine the frequency dependent dielectric constant and the electric conductivity of an electrocrushing drilling fluid using the above-identified or similar equipment by applying the following principles, typically as implemented in a programmed computer receiving data from equipment.

The frequency dependent complex dielectric constant of a fluid may be determined by the following equation, which includes its real and imaginary parts:

$$\varepsilon(\omega) = \varepsilon_r'(\omega) + j\varepsilon_r''(\omega) = \varepsilon_r(\omega)\varepsilon_0 + j\frac{\sigma(\omega)}{\omega}$$

where:

$\varepsilon(\omega)$ is the frequency dependent complex dielectric constant $\varepsilon_r'(\omega)$ is the real part of the dielectric constant $\varepsilon_r''(\omega)$ is the imaginary part of the dielectric constant and $j=\sqrt{-1}$.

In addition, $$\varepsilon_r'(\omega)=\varepsilon_r(\omega)\varepsilon_0$$

so that $$\varepsilon_r(\omega) = \frac{\varepsilon'_r(\omega)}{\varepsilon_0}$$

where:
$\varepsilon_r(\omega)$ is the frequency dependent dielectric constant of the fluid and $\varepsilon_0$ is the permittivity of free space=8.85418782×$10^{-12}$ Farads/Meter.

Additionally, $$\varepsilon''_r(\omega) = \frac{\sigma(\omega)}{\omega}$$

and therefore, $$\sigma(\omega) = \omega \varepsilon''_r(\omega)$$

Where $\sigma(\omega)$ is the frequency dependent electric conductivity of the fluid.

Example 3—Methods of Measuring Dielectric Strength of an Electrocrushing Drilling Fluid Equipment suitable to measure the dielectric strength of an electrocrushing drilling fluid over a given rise time is generally not commercially available, but it may be constructed by attaching an adjustable voltage supply to electrodes immersed in the fluid and otherwise electrically insulated from one another such that an electric field ($\vec{E}$) may be created between the electrodes using the adjustable voltage supply when it applies a voltage (V) across the electrodes. The electrodes may be any shape, such as spheres or plates. The electrodes are separated by a distance D. An ammeter is located in the circuit between the adjustable voltage supply and the negative electrode. The adjustable voltage supply may be used to provide high voltage pulses with an adjustable peak voltage and rise time.

$\vec{E}$ is determined using the following equation:

$$\vec{E} = \frac{V}{D}$$

$\vec{E}$ electric field is a vector quantity and the direction of the electric field goes from the positive electrode toward the negative one. One may alter the electric field by adjusting either V or D.

For a given rise time, for a series of voltage pulses across the electrodes and through the electrocrushing drilling fluid under test, the peak electric field ($\vec{E}$) for each pulse is increased until conduction current is observed in the ammeter. Conduction current indicates electrical breakdown of the liquid. For a given rise time, the electric field the electrocrushing drilling fluid can support without breakdown (and hence measurement of a current by ammeter) is its dielectric strength for that rise time. By varying the rise time and electric field and noting the electric field/rise time combinations where breakdown occurs, one may determine the dielectric strength of the electrocrushing drilling fluid as a function of rise time.

The disclosure provides at least three embodiments A, B, and C.

A. An electrocrushing drilling fluid including a electrocrushing drilling base fluid including, in an invert emulsion, a non-polar oil, water, a —OH, —(OH)$_2$, or —(OH)$_3$ alcohol, and an emulsifier.

B. An electrocrushing drilling system including a drill string, an electrocrushing drill bit attached to the downhole end of the drill string for fracturing rock in a formation, and an electrocrushing drilling fluid that circulates downhole through the drill string and then moves the fractured rock uphole. The electrocrushing drilling fluid is that of embodiment A.

C. A method of electrocrushing drilling by circulating an electrocrushing drilling fluid downhole in a wellbore through a drill string, out of one or more orifices in an electrocrushing drill bit attached to the drill string, and uphole through an annulus, fracturing rock in a formation at a downhole end of the wellbore using an electrocrushing drill bit, and moving the fractured rock uphole with the electrocrushing drilling fluid. The electrocrushing drilling fluid is that of embodiment A.

Each of embodiments A, B, and C may have one or more of the following additional elements in any combination unless clearly mutually exclusive: i) the electrocrushing drilling base fluid may contain, by weight or by volume, relatively more non-polar oil than —OH, —(OH)$_2$, or —(OH)$_3$ alcohol, relatively more —OH, —(OH)$_2$, or —(OH)$_3$ alcohol than water, and relatively more water than emulsifier; ii) the electrocrushing drilling base fluid may have a dielectric constant of at least 6 at 100 kHz frequency; iii) the electrocrushing drilling base fluid may have a dielectric strength of at least 100 kV/cm, at least 150 kV/cm, or at least 330 kV/cm at 10 microseconds rise time; iv) the electrocrushing drilling base fluid may have an electric conductivity of less than $10^{-4}$ mho/com or less than $10^{-5}$ mho/cm; v) the electrocrushing drilling base fluid may have a viscosity of less than 9 cSt at 40° C.; vi) the non-polar oil may include a mineral oil, a diesel oil or fuel, a paraffin-based oil, an oil containing branched and linear aliphatic hydrocarbons having between 8 and 26 carbon atoms and a boiling point in the range of 120° C. to 380° C., an oil containing hydrocarbons having between 10 and 16 carbon atoms and a viscosity of 1.5 to 2 cSt at 40° C., or any combinations thereof; vii) the non-polar oil may have a viscosity of less than 4 cSt at 40° C.; viii) the —OH, —(OH)$_2$, or —(OH)$_3$ alcohol may include glycerin; ix) the electrocrushing drilling base fluid may include between 50% and 75% non-polar oil by weight; x) the electrocrushing drilling base fluid may include between 60%$^0$ and 80% non-polar oil by volume; xi) the electrocrushing drilling base fluid may include between 15% and 35% —OH, —(OH)$_2$, or —(OH)$_3$ alcohol by weight; xii) the electrocrushing drilling base fluid may include between 10% and 30% —OH, —(OH)$_2$, or —(OH)$_3$ alcohol by volume; xiii) the electrocrushing drilling base fluid may include between 2% and 30% water by weight; xiv) the electrocrushing drilling base fluid may include between 1% and 25% water by volume; xv) the electrocrushing drilling base fluid may include between 0.1% and 10% emulsifier by weight; xvi) the electrocrushing drilling base fluid may include between 1.5% and 3.5% emulsifier by volume; xvii) the electrocrushing drilling fluid may include at least one additive comprising an electrical additive, a lost circulation material, a rheology modifier, a weighting agent, a corrosion inhibitor, a defoamer, a shale stabilizer, a lubricant, a wetting agent, a dispersing agent, a shale inhibitor, a pH-control agent, a filtration-control agent, an alkalinity source, a foamer, a viscosifier, a thinner, a deflocculent, or any combinations thereof; xvii) the electrocrushing drilling base fluid may include no more than 0.5% polar oil or alkylene carbonate by weight or by volume; xviii) the electrocrushing drilling fluid may be circulated under sufficient pressure at a location in the wellbore to prevent a blowout at that location; xix) the electrocrushing drilling fluid may be used to remove cavitation bubbles from the vicinity of the electrocrushing drill bit in sufficient quantities within a sufficient time to allow the electrocrushing drilling to proceed downhole at at least a set rate.

Although the present disclosure has been described with several embodiments, various changes and modifications may be suggested to one skilled in the art. It is intended that the present disclosure encompasses such various changes and modifications as falling within the scope of the appended claims.

The invention claimed is:

1. An electrocrushing drilling fluid comprising an electrocrushing drilling base fluid comprising, in an invert emulsion:
 a non-polar oil;
 water;
 a —OH, —(OH)$_2$, or —(OH)$_3$ alcohol; and
 an emulsifier;
 wherein the electrocrushing drilling base fluid contains, by weight or by volume, relatively more non-polar oil than —OH, —(OH)$_2$, or —(OH)$_3$ alcohol; and
 wherein the electrocrushing drilling base fluid has an electric conductivity of less than $10^{-5}$ mho/cm.

2. The electrocrushing drilling fluid of claim 1, wherein the electrocrushing drilling base fluid contains, by weight or by volume, relatively more —OH, —(OH)2, or —(OH)3 alcohol than water, and relatively more water than emulsifier.

3. The electrocrushing drilling fluid of claim 1, wherein the electrocrushing drilling base fluid has a dielectric constant of at least 6 at 100 kHz frequency.

4. The electrocrushing drilling fluid of claim 1, wherein the electrocrushing drilling base fluid has a dielectric strength of at least 100 kV/cm at 10 microseconds rise time.

5. The electrocrushing drilling fluid of claim 1, wherein the electrocrushing drilling base fluid has a viscosity of less than 9 cSt at 40° C.

6. The electrocrushing drilling fluid of claim 1, wherein the non-polar oil comprises a mineral oil, a diesel oil or fuel, a paraffin-based oil, an oil containing branched and linear aliphatic hydrocarbons having between 8 and 26 carbon atoms and a boiling point in the range of 120° C. to 380° C., an oil containing hydrocarbons having between 10 and 16 carbon atoms and a viscosity of 1.5 to 2 cSt at 40° C., or any combinations thereof.

7. The electrocrushing drilling fluid of claim 1, wherein the non-polar oil has a viscosity of less than 4 cSt at 40° C.

8. The electrocrushing drilling fluid of claim 1, wherein the —OH, —(OH)$_2$, or —(OH)$_3$ alcohol comprises glycerin.

9. The electrocrushing drilling fluid of claim 1, wherein the electrocrushing drilling base fluid comprises between 50% and 75% non-polar oil by weight.

10. The electrocrushing drilling fluid of claim 1, wherein the electrocrushing drilling base fluid comprises between 60% and 80% non-polar oil by volume.

11. The electrocrushing drilling fluid of claim 1, wherein the electrocrushing drilling base fluid comprises between 15% and 35% —OH, —(OH)$_2$, or —(OH)$_3$ alcohol by weight.

12. The electrocrushing drilling fluid of claim 1, wherein the electrocrushing drilling base fluid comprises between 10% and 30% —OH, —(OH)$_2$, or —(OH)$_3$ alcohol by volume.

13. The electrocrushing drilling fluid of claim 1, wherein the electrocrushing drilling base fluid comprises between 2% and 30% water by weight.

14. The electrocrushing drilling fluid of claim 1, wherein the electrocrushing drilling base fluid comprises between 1% and 25% water by volume.

15. The electrocrushing drilling fluid of claim 1, wherein the electrocrushing drilling base fluid comprises between 0.1% and 10% emulsifier by weight.

16. The electrocrushing drilling fluid of claim 1, wherein the electrocrushing drilling base fluid comprises between 1.5% and 3.5% emulsifier by volume.

17. The electrocrushing drilling fluid of claim 1, further comprising at least one additive comprising an electrical additive, a lost circulation material, a rheology modifier, a weighting agent, a corrosion inhibitor, a defoamer, a shale stabilizer, a lubricant, a wetting agent, a dispersing agent, a shale inhibitor, a pH-control agent, a filtration-control agent, an alkalinity source, a foamer, a viscosifier, a thinner, a deflocculent, or any combinations thereof.

18. The electrocrushing drilling fluid of claim 1, further comprising no more than 0.5% polar oil or alkylene carbonate by weight or by volume.

19. The electrocrushing drilling fluid of claim 1, wherein:
 the electrocrushing drilling base fluid has a dielectric constant of at least 6 at 100 kHz frequency;
 the electrocrushing drilling base fluid has a dielectric strength of at least 100 kV/cm at 10 microseconds rise time;
 the electrocrushing drilling base fluid has an electric conductivity of less than $10^{-4}$ mho/cm; and
 the electrocrushing drilling base fluid has a viscosity of less than 9 cSt at 40° C.

20. The electrocrushing drilling fluid of claim 1, wherein:
 the electrocrushing drilling base fluid has a dielectric constant of at least 6 at 100 kHz frequency; and
 the electrocrushing drilling base fluid has a dielectric strength of at least 100 kV/cm at 10 microseconds rise time.

21. The electrocrushing drilling fluid of claim 1, wherein:
 the electrocrushing drilling base fluid has a dielectric constant of at least 6 at 100 kHz frequency; and
 the electrocrushing drilling base fluid has an electric conductivity of less than $10^{-4}$ mho/cm.

22. The electrocrushing drilling fluid of claim 1, wherein:
 the electrocrushing drilling base fluid has a dielectric constant of at least 6 at 100 kHz frequency; and
 the electrocrushing drilling base fluid has a viscosity of less than 9 cSt at 40° C.

23. The electrocrushing drilling fluid of claim 1, wherein:
 the electrocrushing drilling base fluid has a dielectric constant of at least 6 at 100 kHz frequency;
 the electrocrushing drilling base fluid has a dielectric strength of at least 100 kV/cm at 10 microseconds rise time; and
 the electrocrushing drilling base fluid has an electric conductivity of less than $10^{-4}$ mho/cm.

24. The electrocrushing drilling fluid of claim 1, wherein:
 the electrocrushing drilling base fluid has a dielectric constant of at least 6 at 100 kHz frequency;
 the electrocrushing drilling base fluid has a dielectric strength of at least 100 kV/cm at 10 microseconds rise time; and the electrocrushing drilling base fluid has a viscosity of less than 9 cSt at 40° C.

25. The electrocrushing drilling fluid of claim 1, wherein:

the electrocrushing drilling base fluid has a dielectric constant of at least 6 at 100 kHz frequency;

the electrocrushing drilling base fluid has an electric conductivity of less than $10^{-4}$ mho/cm; and the electrocrushing drilling base fluid has a viscosity of less than 9 cSt at 40° C.

* * * * *